(12) United States Patent
Miura

(10) Patent No.: US 8,100,434 B2
(45) Date of Patent: Jan. 24, 2012

(54) FRAME STRUCTURE FOR VEHICLE AND VEHICLE

(75) Inventor: Takayoshi Miura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 222 days.

(21) Appl. No.: 12/558,575

(22) Filed: Sep. 14, 2009

(65) Prior Publication Data

US 2010/0078926 A1   Apr. 1, 2010

(30) Foreign Application Priority Data

Sep. 30, 2008   (JP) ................. 2008-253176

(51) Int. Cl.
*B62D 21/00* (2006.01)
(52) U.S. Cl. .......... 280/781; 280/783; 280/785
(58) Field of Classification Search .......... 280/781, 280/783, 785; 180/311, 312
See application file for complete search history.

(56) References Cited

U.S. PATENT DOCUMENTS

| | | | | |
|---|---|---|---|---|
| 7,658,258 B2 * | 2/2010 | Denney | ............. | 180/311 |
| 7,690,462 B2 * | 4/2010 | Kato et al. | ............. | 180/68.3 |
| 7,717,206 B2 * | 5/2010 | Tanaka et al. | ............. | 180/68.3 |
| 7,819,220 B2 * | 10/2010 | Sunsdahl et al. | ............. | 180/312 |
| 7,954,853 B2 * | 6/2011 | Davis et al. | ............. | 280/783 |

FOREIGN PATENT DOCUMENTS

JP   2006-103370   4/2006

* cited by examiner

*Primary Examiner* — Toan To
(74) *Attorney, Agent, or Firm* — Ditthavong Mori & Steiner, P.C.

(57) ABSTRACT

A frame structure for a vehicle includes a vehicle body frame, a pair of occupant seats, and a center pipe. The vehicle body frame has a front-rear direction. The pair of occupant seats includes a driver's seat and a passenger seat and are arranged side by side in a vehicle width direction substantially orthogonal to the front-rear direction. The center pipe extends in the front-rear direction and is arranged substantially on a center line of a vehicle body so as to pass through positions between the driver's seat and the passenger seat in the vehicle body frame.

20 Claims, 11 Drawing Sheets

FRAME STRUCTURE FOR VEHICLE AND VEHICLE

CROSS-REFERENCE TO RELATED APPLICATIONS

The present application claims priority under 35 U.S.C. §119 to Japanese Patent Application No. 2008-253176, filed Sep. 30, 2008. The contents of this application are incorporated herein by reference in their entirety.

BACKGROUND OF THE INVENTION

1. Field of the Invention

The present invention relates to a frame structure for a vehicle and a vehicle.

2. Discussion of the Background

There is a conventionally-known vehicle body frame structure for a vehicle, which is intended to reduce the weight of a vehicle and to reduce the manufacturing costs (refer to, for example, Japanese Patent Application Publication No. 2006-103370). The vehicle body frame structure described in Japanese Patent Application Publication No. 2006-103370 has a vehicle body frame including: a front frame portion which supports a front-wheel drive system; a center frame portion which forms a space for occupants; and a rear frame portion which supports a rear-wheel drive system. In the center frame portion, the structure of an underfloor frame is formed to be a two-layer structure having an upper portion and a lower portion. The upper portion includes lower frames and side square-U-shaped frames, and the lower portion includes subframes and upper side frames.

In the vehicle body frame structure described in Japanese Patent Application Publication No. 2006-103370, the structure of the underfloor frame in the center frame portion is formed to be the two-layer structure having the upper and lower portions. This structure sufficiently secures the rigidity of the underfloor frame, but increases the height of the floor, thus leading to an increase in the height of the seats for the occupants. On the other hand, in order to enhance the traveling performance required for vehicles such as MUVs (multi utility vehicle), it is desirable that the vehicles have a low floor and a low center of gravity in addition to an improvement in rigidity of the vehicle body frame.

SUMMARY OF THE INVENTION

According to one aspect of the present invention, a frame structure for a vehicle includes a vehicle body frame, a pair of occupant seats, and a center pipe. The vehicle body frame has a front-rear direction. The pair of occupant seats include a driver's seat and a passenger seat and are arranged side by side in a vehicle width direction substantially orthogonal to the front-rear direction. The center pipe extends in the front-rear direction and is arranged substantially on a center line of a vehicle body so as to pass through positions between the driver's seat and the passenger seat in the vehicle body frame.

According to another aspect of the present invention, a vehicle includes an internal combustion engine, a vehicle body frame, a pair of occupant seats, and a center pipe. The vehicle body frame has a front-rear direction and supports the internal combustion engine. The pair of occupant seats include a driver's seat and a passenger seat and are arranged side by side in a vehicle width direction substantially orthogonal to the front-rear direction. The center pipe extends in the front-rear direction and is arranged substantially on a center line of a vehicle body so as to pass through positions between the driver's seat and the passenger seat in the vehicle body frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
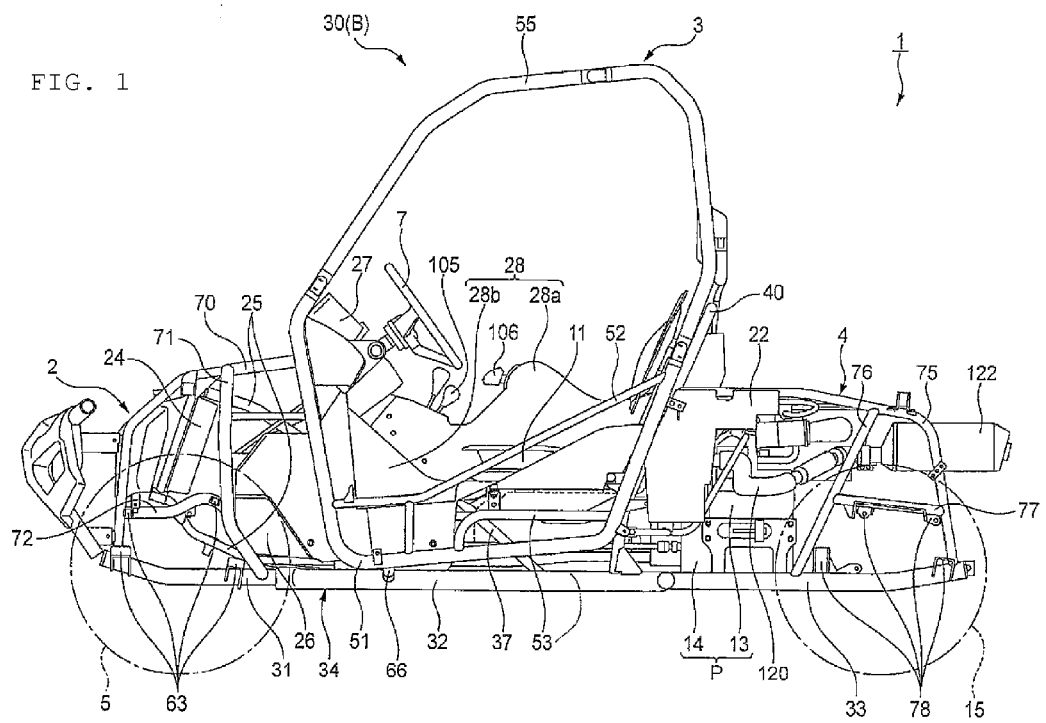
FIG. 1 is a left-side view of a vehicle employing a frame structure for a vehicle according to an embodiment of the present invention.

The embodiments will now be described with reference to the accompanying drawings, wherein like reference numerals designate corresponding or identical elements throughout the various drawings.

Hereinafter, a frame structure for a vehicle according to an embodiment of the present invention will be described by giving an MUV (multi utility vehicle) as an example. Note that the drawings should be viewed in the direction of orientation of reference numerals.

Figure 2:
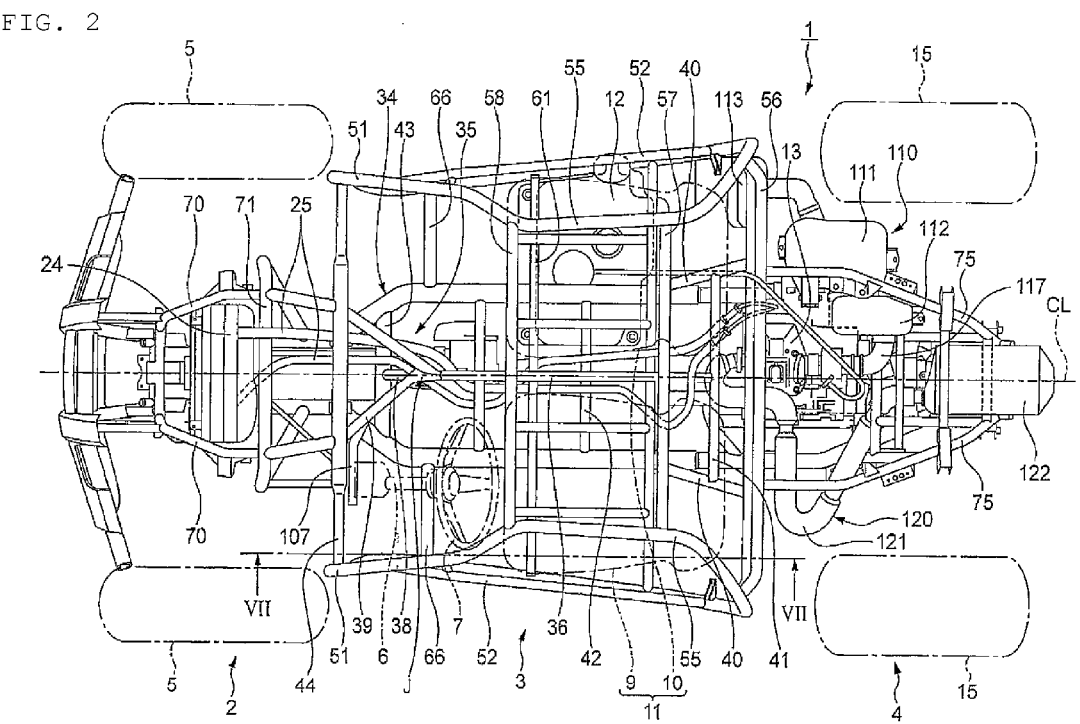
FIG. 2 is a plan view of the vehicle illustrated in FIG. 1.
Figure 3:
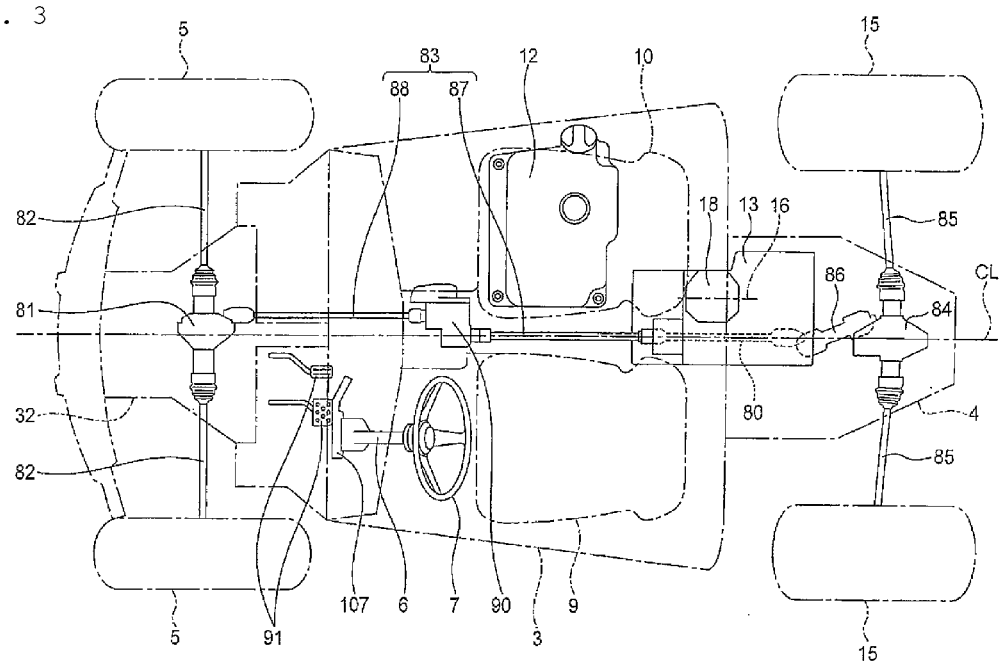
FIG. 3 is a plan view of chief parts of a power transmission mechanism of the vehicle illustrated in FIG. 1.

As illustrated in FIGS. 1 to 3, a vehicle 1 according to the embodiment includes a vehicle body frame 30 which includes a front frame portion 2, a center frame portion 3, and a rear frame portion 4 so as to constitute a vehicle body B. A front-wheel suspension system (not illustrated) which suspends left and right front wheels 5 is attached to the front frame portion 2. In addition, a front-wheel drive system including a front differential gear unit 81, front drive shafts 82, and the like; steering members (including a steering shaft 6 and a steering wheel 7 attached to an upper end of the steering shaft 6) for steering the front wheels 5; and the like are supported on the front frame portion 2.

A pair of occupant seats 11, constituting a driver's seat 9 and a passenger seat 10 arranged side by side in a vehicle width direction, are attached to the center frame portion 3, so that a space for occupants is formed. A fuel tank 12 is disposed in a space below the passenger seat 10. A front propeller shaft 83 coupling a power unit P and a front differential gear unit 81 is disposed between the driver's seat 9 and the passenger seat 10.

A rear-wheel suspension system (not illustrated) which suspends left and right rear wheels 15 is attached to the rear frame portion 4. In addition, a rear-wheel drive system including, for example, a rear propeller shaft 86, a rear differential gear unit 84, rear drive shafts 85; and the like are supported on the rear frame portion 4 in addition to the power unit P including an internal combustion engine 13 and a transmission 14.

As illustrated in FIG. 3, the power unit P supported on the rear frame portion 4 is laid out vertically in such a manner that a crankshaft 16 of the internal combustion engine 13 is directed in a front-rear direction of the vehicle body. An output shaft 80 to which a driving force is transmitted from the crankshaft 16 is disposed substantially on a center line CL of the vehicle body. The output shaft 80 is coupled at a front end thereof to the front propeller shaft 83 and is coupled at a rear end thereof to the rear propeller shaft 86.

The rear propeller shaft 86 is connected to the rear differential gear unit 84 disposed substantially on the center line CL of the vehicle body. The driving force of the internal combustion engine 13 is transmitted to the left and right rear wheels 15 via the rear propeller shaft 86, the rear differential gear unit 84, and then the rear drive shafts 85 connected to the rear differential gear unit 84.

The front propeller shaft 83 is provided with a reduction gear 90 at an intermediate portion of the front propeller shaft 83. The front propeller shaft 83 is constituted of a first propeller shaft 87 and a second propeller shaft 88. The first propeller shaft 87 is disposed at the rear of the reduction gear 90, while the second propeller shaft 88 is disposed at the front of the reduction gear 90. The reduction gear 90 transmits the rotational force of the first propeller shaft 87 to the second propeller shaft 88 while converting the rotational direction of the first propeller shaft 87 into the reverse direction in order to rotate the front wheels 5 and the rear wheels 15 in the same direction. Accordingly, the driving force of the internal combustion engine 13 is transmitted to the left and right front wheels 5 via the first propeller shaft 87, the reduction gear 90, the second propeller shaft 88, the front differential gear unit 81, and then the front drive shafts 82 connected to the front differential gear unit 81.

Figure 8:
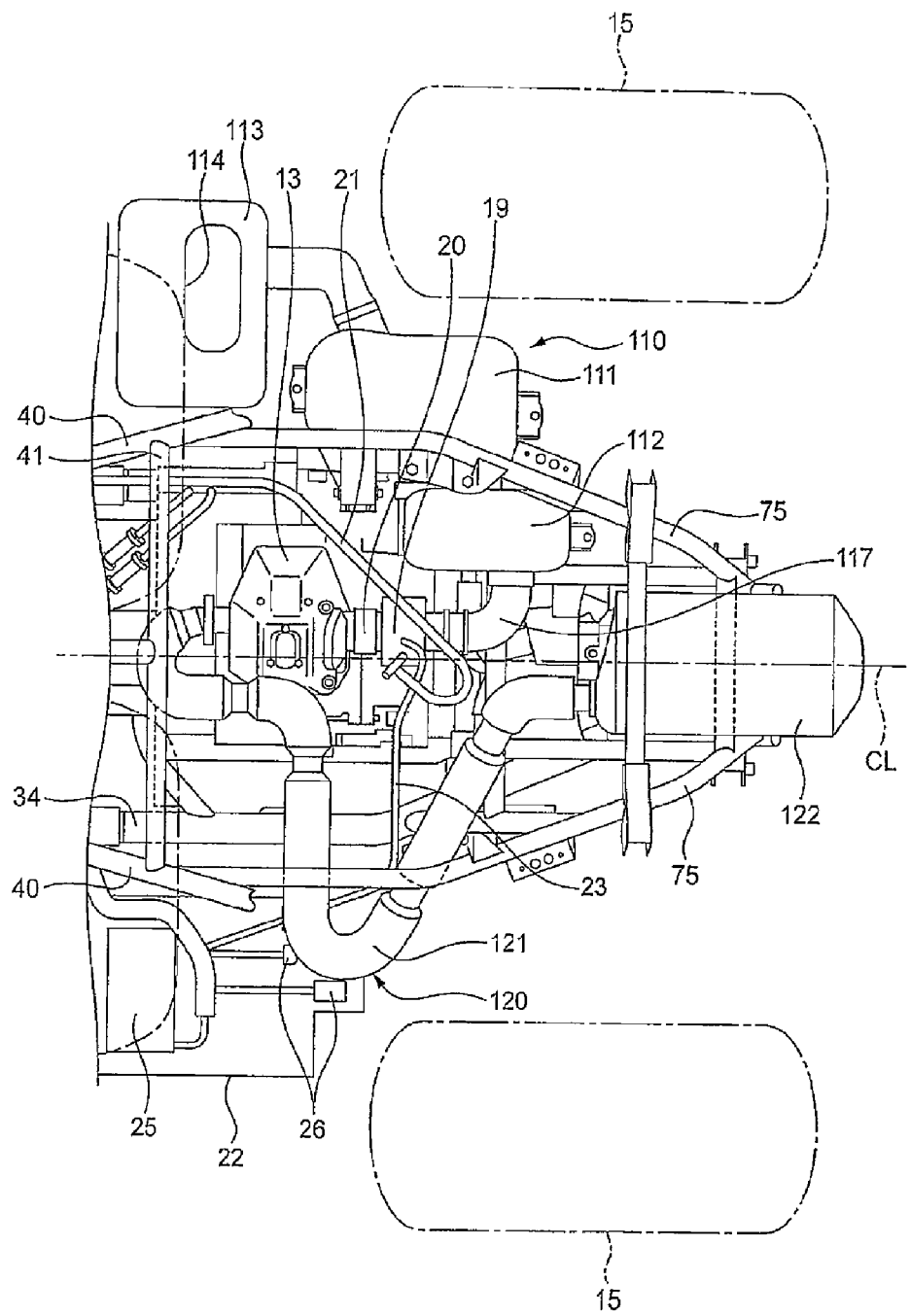
FIG. 8 is a plan view illustrating, in an enlarged manner, rear chief parts illustrated in FIG. 2.

As illustrated in an enlarged manner in FIG. 8, a throttle valve unit 19 is connected to a rear portion of a cylinder head 18 of the internal combustion engine 13 via an intake manifold 20. An exhaust pipe 120, which will be described later, is connected to a front portion of the cylinder head 18. An air cleaner 110 including first and second air cleaner chambers 111 and 112, which will be described later, is connected to a rear portion of the throttle valve unit 19 via a connecting tube 117. Moreover, a fuel supply pipe 21 and a wire harness 23 are connected to the throttle valve unit 19. The fuel supply pipe 21 extends from the fuel tank 12. The wire harness 23 is arranged to extend from a battery case 22 including the battery case 22, an ECU 26, and the like.

Figure 4:
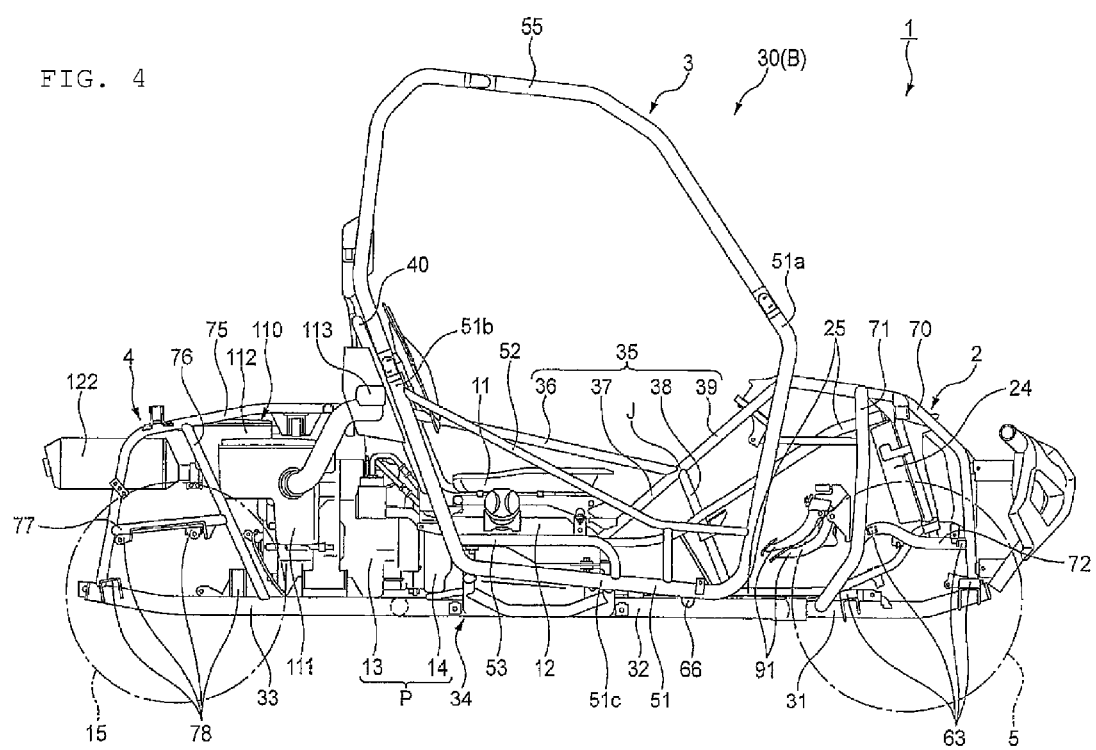
FIG. 4 is a right-side view of the vehicle illustrated in FIG. 1.

Moreover, as illustrated in FIGS. 2 and 4, a radiator 24 disposed in the front frame portion 2 is connected to the internal combustion engine 13 via two water supply pipes 25. Thus, cooling water for cooling the internal combustion engine 13 circulates between the radiator 24 and the internal combustion engine 13 through the water supply pipes 25.

Note that, in FIG. 1, reference numeral 26 denotes a front cover; reference numeral 27 denotes an instrument panel; reference numeral 28 denotes a center console cover including a center cover member 28a as well as a pair of left and right cover members 28b.

Figure 5:
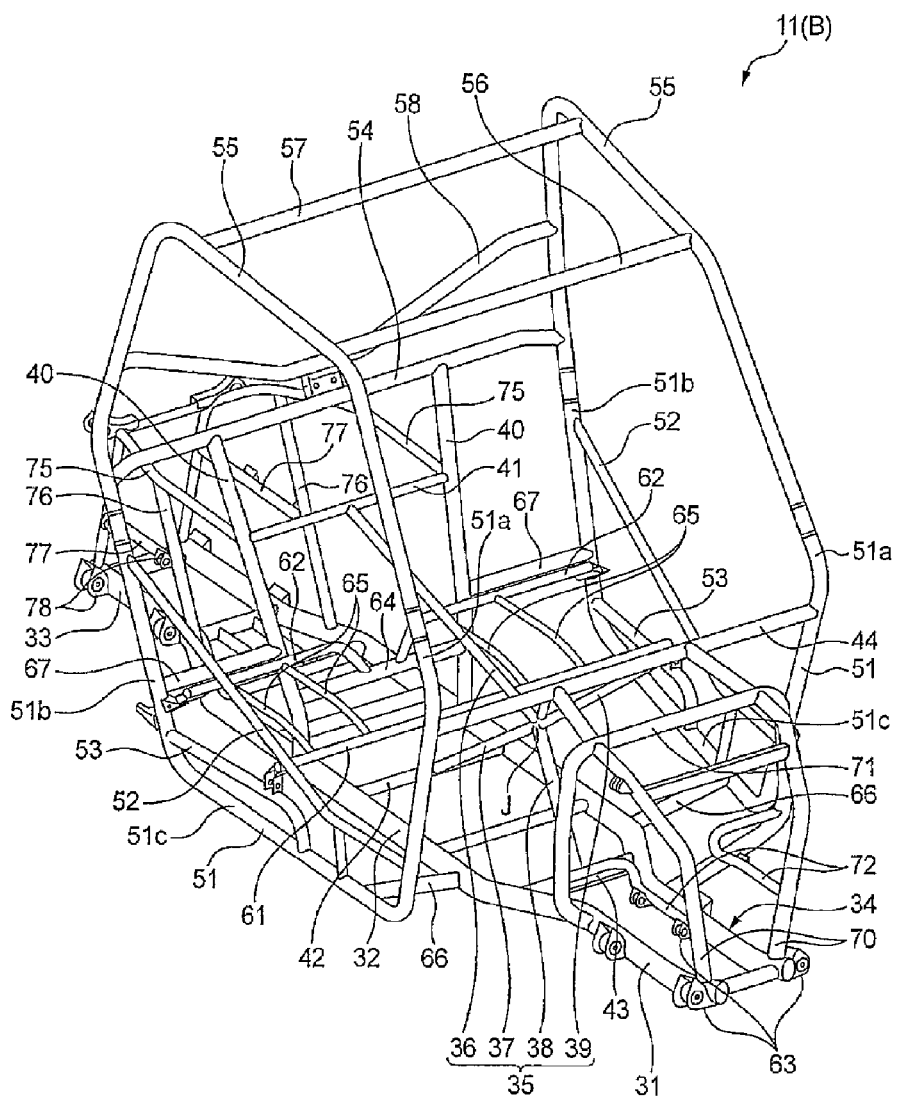
FIG. 5 is a perspective view illustrating the frame structure of the vehicle illustrated in FIG. 1.
Figure 6:
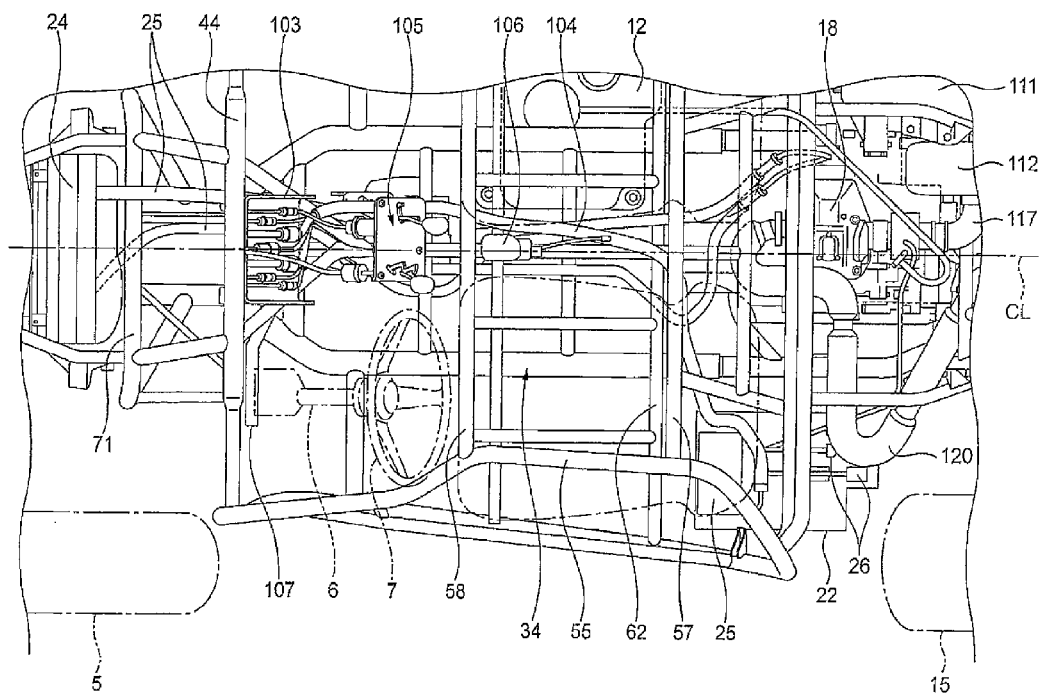
FIG. 6 is a plan view illustrating, in an enlarged manner, chief parts where wires are arranged.

As illustrated in FIGS. 4 and 5, the vehicle body frame 30 includes a pair of lower frames 34 disposed respectively in left and right lower portions of the vehicle body B and extending in the front-rear direction. Each of the lower frames 34 forms a front lower frame 31, a center lower frame 32, and a rear lower frame 33.

In the front frame portion 2, a pair of left and right front upper frames 70 extend upward from front ends of the respective front lower frames 31, further extend rearward, and then are joined to a front upper cross-member 44. In this manner, the left and right front upper frames 70 cover a front portion of the vehicle body B from above. The front lower frames 31 and the front upper frames 70 are coupled to one another by a square U-shaped frame 71.

In addition, rising portions of the square U-shaped frame 71 are coupled respectively to rising portions of the front upper frames 70 by front-suspension support pipes 72 each formed into a substantially L-shape. Two brackets 63 are fixed onto each of the front lower frames 31 and the front-suspension support pipes 72, and the front-wheel suspension system is swingably disposed on the brackets 63. The front-wheel suspension system rotatably suspends the left and right front wheels 5.

On the other hand, in the rear frame portion 4, a pair of left and right rear upper frames 75 extend upward from rear ends of the rear lower frames 33, thereafter are bent to extend frontward in such a manner as to cover the power unit P including the internal combustion engine 13, and then are joined respectively to a pair of center upright frames 40. The center upright frames 40 extend upward from portions, behind the occupant seats 11, of the respective center lower frames 32. Horizontal portions of the rear upper frames 75 are vertically connected to the rear lower frames 33 respectively by rear upright frames 76, each of which is inclined frontward while extending downward. Moreover, the rear upright frames 76 are connected respectively to perpendicular portions of the corresponding rear upper frames 75 respectively by rear-suspension support pipes 77.

Two brackets 78 are fixed respectively onto front and rear portions of each of the rear lower frames 33 and the rear-suspension support pipes 77. The rear-wheel suspension system is swingably disposed on the four brackets 78 in total. The rear-wheel suspension system suspends the left and right rear wheels 15 in a manner that the rear wheels 15 are rotatable.

In the center frame portion 3, a pair of left and right side frames 51, which extend in the front-rear direction, are disposed respectively outside the center lower frames 32 in the vehicle width direction. The side frames 51 are joined to the respective lower frames 34 by connecting pipes 66 and connecting pipes 67. The connecting pipes 66 are connected to front portions of the respective center lower frames 32, while the connecting pipes 67 are connected to intermediate portions of the respective center upright frames 40.

Each of the side frames 51 includes a front rising portion 51a, a rear rising portion 51b, and a horizontal portion 51c joining the front and rear rising portions 51a and 51b, and is thus formed in a substantially square U-shape, which is convex downward.

In each of the substantially square U-shaped side frames 51, the front rising portion 51a and the rear rising portion 51b are coupled to each other by a side pipe 52 in the front-rear direction. End portions of the respective front rising portions 51a of the pair of side frames 51 are coupled to each other by the front upper cross-member 44 in the vehicle width direction. Middle portions of each rear rising portion 51b and the corresponding horizontal portion 51c are coupled to each other by a seat supporting pipe 53 having a substantially L shape.

A pair of side upper frames 55, each formed into a substantially square U shape, are each connected to the front rising portion 51a and the rear rising portion 51b of a corresponding one of the pair of side frames 51 in such a manner that the side upper frame 55 is convex upward. The pair of side upper frames 55 are coupled to each other in the vehicle width direction by: a first upper cross-member 54, to which the pair of center upright frames 40 are joined at upper end portions thereof; two roof cross-members 56 and 57; and a cross-member 58 for headrest, which is joined at a middle portion thereof to the first upper cross-member 54.

A first seat cross-member 61 is laid between the pair of seat supporting pipes 53 with brackets therebetween. In addition, a pair of second seat cross-members 62 are joined to the rear rising portions 51b of the respective side frames 51 with brackets therebetween. The second seat cross-members 62 are joined to a rear cross-member 64 which connects the pair of center upright frames 40 to each other at portions lower than the middle portions thereof. The first and second seat cross-members 61 and 62 as well as coupling frames 65, which couple the respective second seat cross-members 62 to the first seat cross-member 61 in the front-rear direction, constitute seat frames. Seat pipes 60 (refer to FIG. 9) for the driver's seat 9 and the passenger seat 10 are attached to the seat frames.

In addition, in the center frame portion 3, a center pipe 35 is provided. The center pipe 35 passes between the driver's seat 9 and the passenger seat 10 and is arranged above the lower frames 34 to extend in the front-rear direction substantially on the center line CL of the vehicle body. Accordingly, the center frame portion 3 has a structure in which the center pipe 35 and the pair of lower frames 34 are disposed respectively on the upper and lower sides in the center portion in the vehicle width direction, and the side pipe 52 and the side frame 51 are disposed on the upper and lower sides in each of the side portions. This structure makes it possible to improve the rigidity of the center frame portion 3 as well as to achieve a low floor and a low center of gravity.

Figure 7:
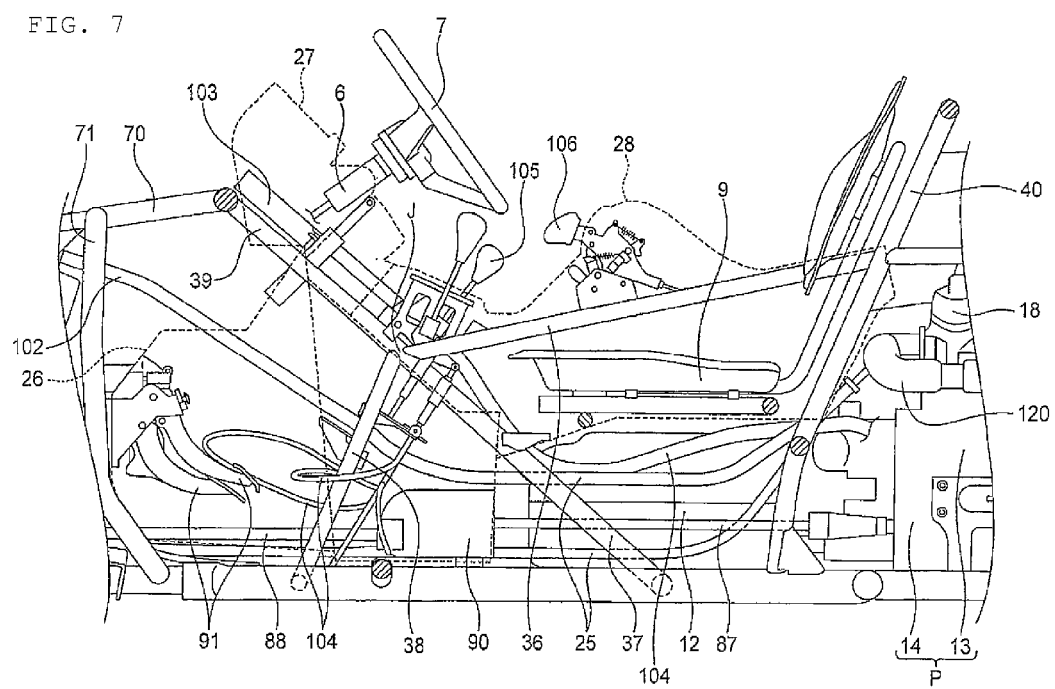
FIG. 7 is a side view taken along the line VII-VII in FIG. 2, and illustrating, in an enlarged manner, an inside of a center console cover.

As illustrated in an enlarged manner also in FIG. 7, the center pipe 35 includes an upper center pipe 36, a down center pipe 37, an upright center pipe 38, and a front center pipe 39. These members 36, 37, 38, and 39 are joined together at a joint point J located in front of the occupant seats 11.

The upper center pipe 36 extends frontward while being joined at one end thereof to a center portion of a rear upper cross-member 41 which couples the pair of center upright frames 40 to each other. The down center pipe 37 extends upward and frontward while being joined at one end thereof to a center portion of a rear lower cross-member 42 which is laid between the center lower frames 32 at a position below the occupant seats 11.

The upright center pipe 38 extends rearward and upward while being joined at one end thereof to a center portion of a front lower cross-member 43 which is laid between the center lower frames 32 at a position in front of the occupant seats 11. The front center pipe 39 is a pipe member that is formed into a substantially V shape with two branches extending frontward respectively to the left and right from the joint point J as the base point. An end portion of each of the left and right branches is joined to the front upper cross-member 44 in a vicinity of the joint portion of a corresponding one of the front upper frames 70 to the front upper cross-member 44.

Note that, in the embodiment, the pair of center upright frames 40 and the rear upper cross-member 41 are frames, which constitute, behind the occupant seats, the vehicle body frame; the center lower frames 32 and the rear lower cross-member 42 are frames constituting a lower frame; and the front upper frames 70 and the front upper cross-member 44 are frames constituting, in front of the occupant seats, the vehicle body frame.

On the center pipe 35 constituted as described above, a shift lever 105 is attached to a portion above a vicinity of the joint point J having increased rigidity, and a side-brake lever 106 is attached to a portion above an intermediate portion of the upper center pipe 36. Note that, the steering shaft 6, which is a steering member, is attached to the front upper cross-member 44 with a subframe 107 interposed therebetween. Wires extend from the shift lever 105, the side-brake lever 106, and the steering shaft 6, as well as from foot controls 91, such as a brake pedal and an acceleration pedal, disposed on the driver's seat 9 side, and the like. These extending wires are gathered in an electric connection box 103, and then bundled into a single wire harness 104, which is eventually connected to the battery case 22 provided behind the driver's seat 9.

In addition, as illustrated in FIGS. 2, 3 and 7, the first propeller shaft 87 is located below and along the center pipe 35 substantially on the center line CL of the vehicle body. The first propeller shaft 87 is disposed also in such a manner as to overlap the fuel tank 12 in a side view, in other words, in such a manner that the first propeller shaft 87 and the fuel tank 12 are arranged side by side in the vehicle width direction. The second propeller shaft 88 connected to the reduction gear 90 is disposed offset toward the passenger seat 10 in the vehicle width direction with respect to the first propeller shaft 87. Moreover, the second propeller shaft 88 is coupled, on the passenger seat 10 side, to the front differential gear unit 81 disposed substantially on the center line CL of the vehicle body above the front lower frames 31.

As described above, since the front propeller shaft 83 is arranged substantially along the center pipe 35, the torsion in the vehicle 1 is unlikely to act on the front propeller shaft 83. In addition, since the second propeller shaft 88 is disposed offset toward the passenger seat 10 in the vehicle width direction, a large space for occupants can be secured even with the lowered floor, and also, the flexibility in layout of the foot controls 91 is improved, so that the foot controls 91 can be disposed at positions where the foot controls 91 are easily operated.

Moreover, the reduction gear 90 is located in front of the pair of occupant seats 11, and also behind the foot controls 91, such as the brake pedal and acceleration pedal, disposed on the driver's seat 9 side, and is disposed between the down center pipe 37 and the upright center pipe 38.

The two water supply pipes 25, which connect the radiator 24 and the internal combustion engine 13, as well as the wire harness 104, which electrically connects the electric connection box 103 and the battery case 22, are also disposed offset toward the passenger seat 10 side in the vehicle width direction, partially in a region in front of the upright center pipe 38, as in the case of the front propeller shaft 83.

Accordingly, the center console cover 28 provided between the driver's seat 9 and the passenger seat 10 houses the center pipe 35, the front propeller shaft 83, the reduction gear 90, the water supply pipes 25, the wire harness 104, the shift lever 105, and the side brake lever 106, while a front portion of the center console cover 28 is offset toward the passenger seat 10 side.

With this arrangement, the water supply pipes 25 and the wire harness 104 are compactly arranged by utilizing the dead space. As a result, a large space for occupants can be secured, and also, the flexibility in layout of the foot controls 91 is improved, so that the foot controls 91 can be disposed at positions where the foot controls 91 are easily operated.

Further, while the vehicle body frame 30 is formed in a bilaterally symmetrical arrangement, the front differential gear unit 81, the reduction gear 90, the internal combustion engine 13, the rear differential gear unit 84, and the like, which are major heavy components, are disposed substantially on the center line CL of the vehicle body. As a result, a favorable weight balance between the left and right sides is achieved to increase the stability of the vehicle 1.

Figure 9:
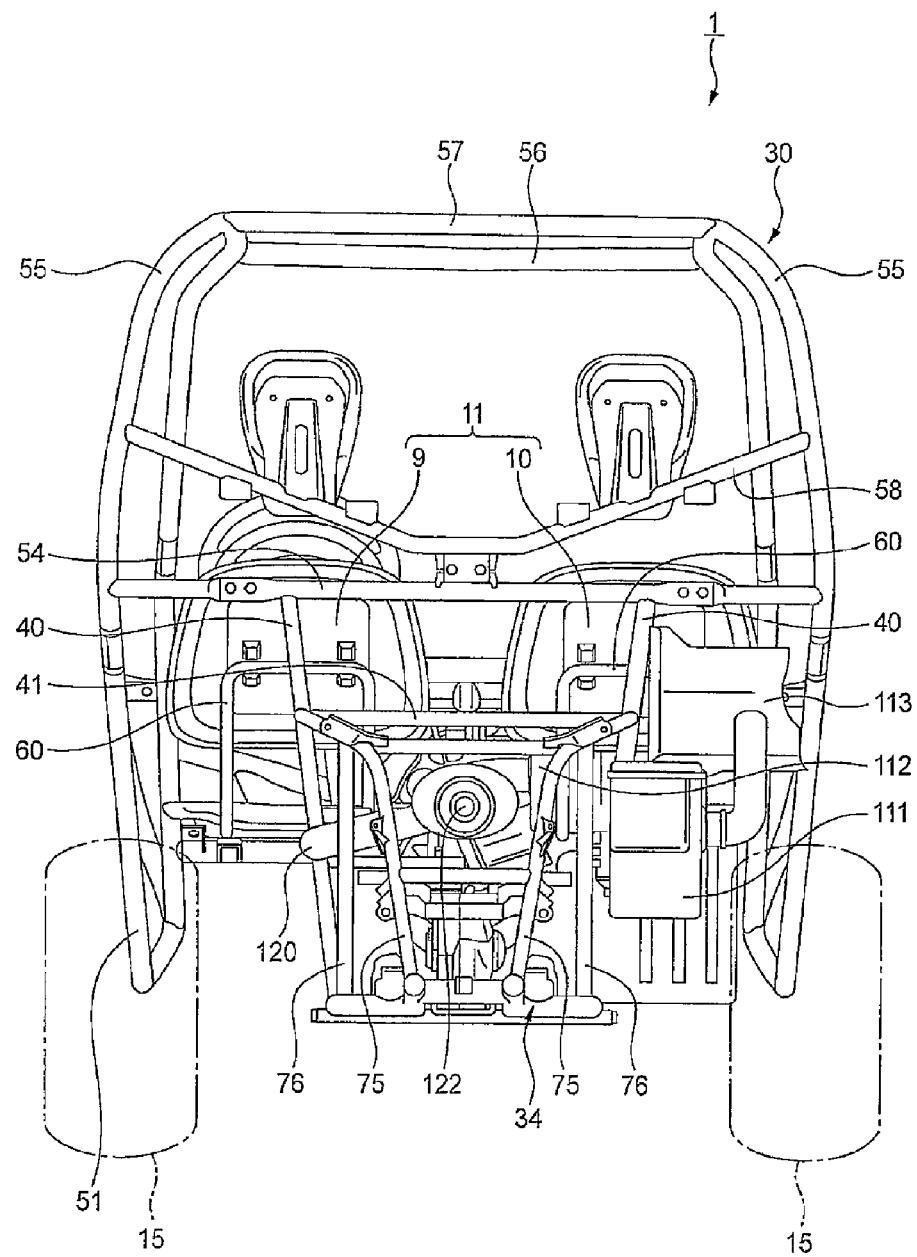
FIG. 9 is a rear view of the vehicle illustrated in FIG. 1.
Figure 10:
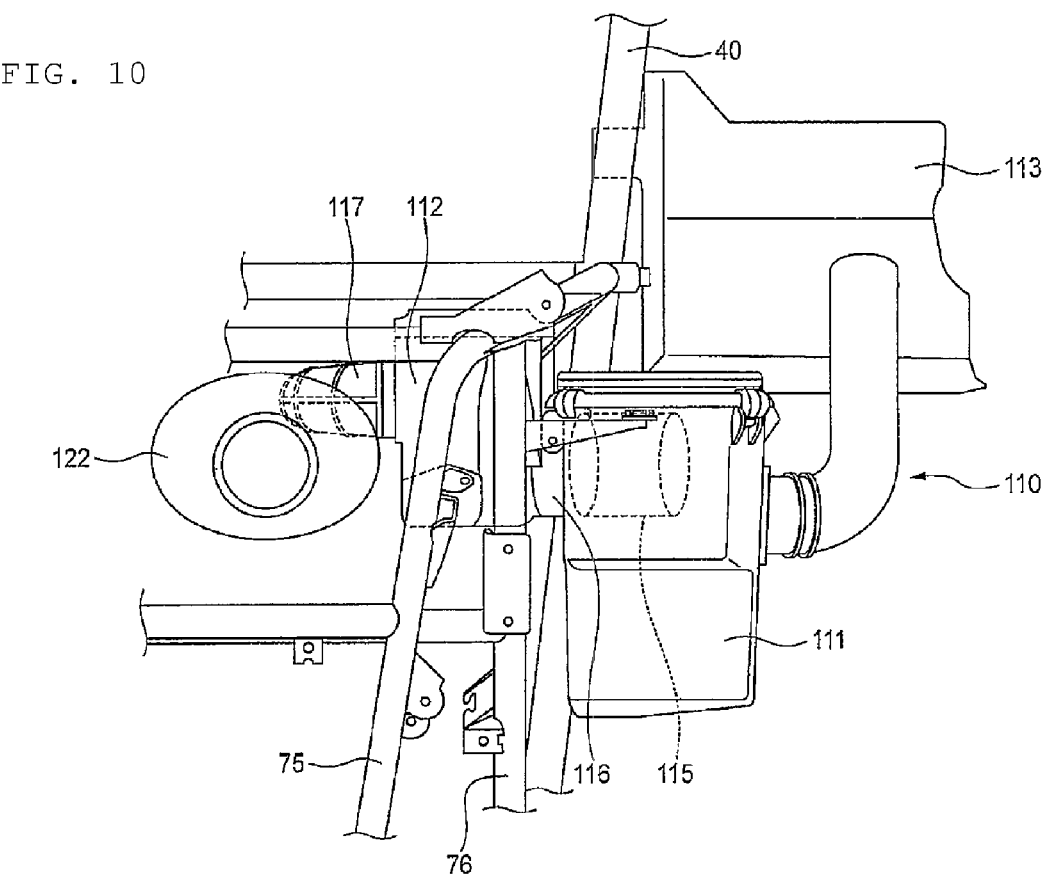
FIG. 10 is a rear view illustrating, in an enlarged manner, chief parts of an intake structure illustrated in FIG. 9.

As illustrated in FIGS. 8 to 10, the air cleaner 110, which is an air-intake device, is disposed behind the passenger seat 10 on the right side of the internal combustion engine 13, and includes the first air cleaner chamber 111 and the second air cleaner chamber 112.

A snorkel 113 is connected to the first air cleaner chamber 111 via a duct attached to an outer side surface of the first air cleaner chamber 111 in the vehicle width direction. The snorkel 113 is disposed behind the passenger seat 10 and has a cover 114 for covering its opening. The first air cleaner chamber 111 and the second air cleaner chamber 112 face each other in the vehicle width direction with the rear upright frame 76 on the corresponding side being partially sandwiched therebetween, and communicate with each other via a coupling tube 116. In addition, the second air cleaner chamber 112 is connected to the internal combustion engine 13 via the connecting tube 117.

Accordingly, the first air cleaner chamber 111 is disposed outside the corresponding rear upright frame 76 in the vehicle width direction, and the second air cleaner chamber 112 is disposed inside the rear upright frame 76 in the vehicle width direction. In addition, an air cleaner element 115 for removing dust in the air is housed in the first air cleaner chamber 111.

In the air cleaner 110 as described above, external air is introduced from the snorkel 113; then dust in the air thus introduced is removed by the air cleaner element 115 in the first air cleaner chamber 111; the purified air is guided to the second air cleaner chamber 112 through the coupling tube 116, and thereafter, is supplied to the internal combustion engine 13 from the connecting tube 117.

Since the air cleaner 110 is constituted of: the first air cleaner chamber 111 disposed outward of the corresponding lower frame 34 in the vehicle width direction and the second air cleaner chamber 112 disposed inward thereof in the vehicle width direction. Accordingly, the air cleaner 110 having a large capacity can be compactly disposed in a narrow space surrounded by the frames. In addition, since the first air cleaner chamber 111 is disposed outward of the corresponding rear upright frame 76 in the vehicle width direction, a large space for maintenance of the air cleaner 110 can be secured. For this reason, a maintenance operation can be easily performed on the air cleaner 110, that is, the air cleaner 110 has an excellent maintainability.

It should be noted that the above-described effect can be obtained even when the first and second cleaner chambers 111 and 112 are disposed to sandwich a part of the corresponding lower frame 34 or of the corresponding rear upper frame 75 instead of the rear upright frame 76, in accordance with the position where these chambers 111 and 112 are attached.

Figure 11:
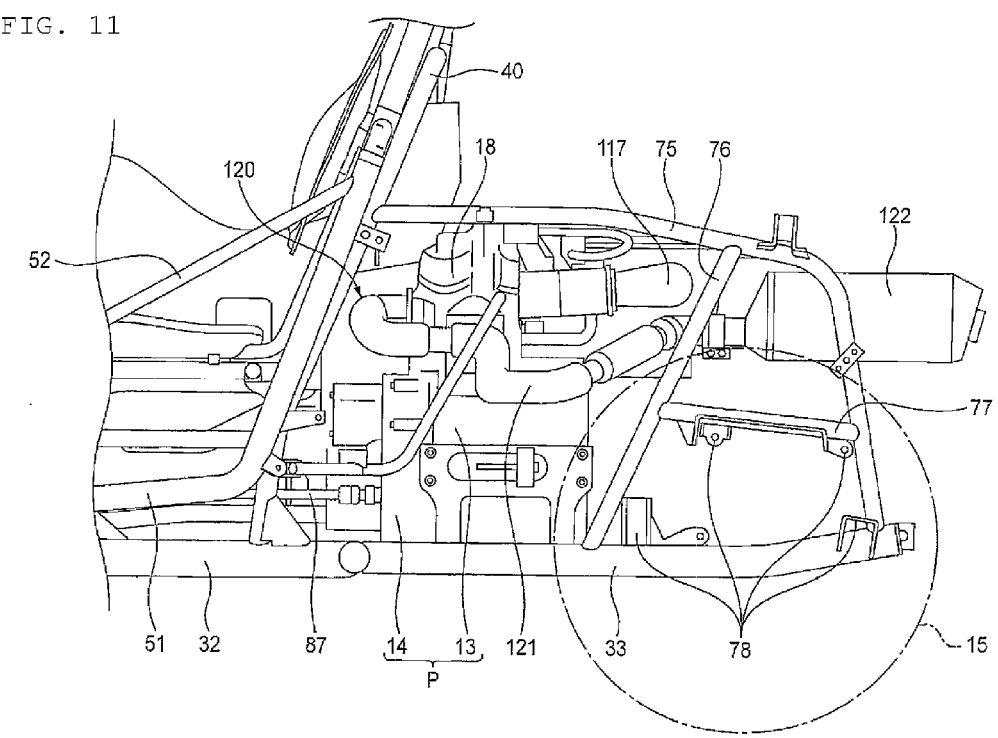
FIG. 11 is a side view illustrating, in an enlarged manner, a rear frame portion illustrated in FIG. 1.

Moreover, as illustrated in FIGS. 8 and 11, the exhaust pipe 120 connected to the front portion of the cylinder head 18 first extends frontward, thereafter turns around and extends rearward, is further bent at substantially 90°, and linearly extends to the outside of the vehicle body while being inclined downward with respect to the horizontal plane. Moreover, after reaching a region behind the driver's seat 9 in the vehicle width direction, the exhaust pipe 120 is bent to the inside of the vehicle body and linearly extends back substantially onto the center line CL of the vehicle body while being inclined upward, and is then connected to a muffler 122 disposed to extend in the front-rear direction substantially on the center line CL of the vehicle body in the rear frame portion 4. With this arrangement, an outermost extending portion 121 of the exhaust pipe 120 extends to a region inside a rearward extension line of the corresponding side frame 51 in the vehicle width direction and outside the corresponding rear upper frame 75 in the vehicle width direction.

Accordingly, a required length can be secured for the exhaust pipe 120 even in, for example, the vehicle 1 having the lowered floor, in which the space in the rear frame portion 4 is limited with the internal combustion engine 13 disposed behind the occupant seats 11. Moreover, having many straight portions, the exhaust pipe 120 can be easily processed, so that the number of assembly processes can be reduced and that the manufacturing costs thus can be suppressed.

The outermost extending portion 121 of the exhaust pipe 120 extends to the region inside the rearward extension line of the corresponding side frame 51 in the vehicle width direction and outside the corresponding rear upper frame 75 in the vehicle width direction. With this arrangement, the exhaust pipe 120 is protected while the length of the exhaust pipe 120 is sufficiently secured.

In addition, the exhaust pipe 120 extends back substantially onto the center line CL of the vehicle body within a region in front of the rear upright frames 76. This makes it possible to securely prevent an interference of the exhaust pipe 120 with the rear-wheel suspension system disposed rearward of the rear upright frames 76.

As described above, according to the frame structure for a vehicle of the embodiment, the center pipe 35 extends between the driver's seat 9 and the passenger seat 10, and is arranged in the front-rear direction substantially on the center line CL of the vehicle body in the vehicle body frame 30. This arrangement makes it possible to improve the rigidity of the vehicle body frame 30.

In addition, the frame structure for a vehicle includes the pair of left and right side frames 51 extending in the front-rear direction respectively outside the lower frames 34 in the vehicle width direction. The front and rear portions of each side frame 51 are connected to each other by the side pipe 52, and the center pipe 35 is arranged above the lower frames 34 to extend in the front-rear direction substantially on the center line CL of the vehicle body. Accordingly, the rigidity of the side portions of the vehicle body frame 30 is secured by the pair of side frames 51 and the pair of side pipes 52 disposed respectively on the upper and lower sides, while the rigidity of the center portion of the vehicle body frame 30 is secured by the center pipe 35 and the pair of lower frames 34 disposed respectively on the upper and lower sides. With this structure, the height of the occupant seats and the floor height can be lowered while the rigidity of the vehicle body frame 30 is sufficiently maintained, so that a low floor and a low center of gravity can be achieved.

Furthermore, the center pipe 35 includes the upper center pipe 36, the down center pipe 37, the upright center pipe 38, and the front center pipe 39. These members 36, 37, 38, and 39 are joined together at the joint point J located in front of the occupant seats 11. Accordingly, this center pipe structure makes it possible to improve the rigidity of the vehicle body.

In addition, the frame structure for a vehicle includes the pair of left and right front upper frames 70 extending from front ends of the respective front lower frames 31 so as to cover the front portion of the vehicle body B from above. Moreover, the front center pipe 39 formed into the left and right branches is joined to the front upper cross-member 44 in the vicinities of the respective joint portions of the front upper frames 70 to the front upper cross-member 44. This makes it possible to further improve the rigidity of the vehicle body B, and also to reduce a bending force acting on the front upper cross-member 44.

In addition, since the front propeller shaft 83 which transmits the driving force of the internal combustion engine 13 to the front-wheel drive system is arranged substantially along the center pipe 35, the torsion in the vehicle body B is unlikely to act on the front propeller shaft 83. Moreover, the front propeller shaft 83 can be disposed by utilizing the dead space below the center pipe 35, which enables a compact layout, so that a large space for occupants can be secured.

Furthermore, the reduction gear 90, which converts the rotational direction of the front propeller shaft 83 into the reverse direction, is located in front of the occupant seats 11, and also behind the foot controls 91, and is disposed between the down center pipe 37 and the upright center pipe 38. Accordingly, the reduction gear 90 can be disposed in the dead space where the rigidity of the vehicle body is high. As a result, it is possible to protect the reduction gear 90, and to enable a compact layout, which secures a large space for occupants.

In addition, since the center pipe 35 is provided in the center frame portion 3 having the space for occupants therein, the rigidity of the center frame portion 3 can be improved.

In addition, the radiator 24 is arranged in the front frame portion 2, and the internal combustion engine 13 is arranged in the rear frame portion 4. In this arrangement, the water supply pipes 25 connecting the radiator 24 and the internal combustion engine 13 are arranged substantially along the center pipe 35 in such a manner as to extend in a region on the passenger seat 10 side of the upright center pipe 38 in front of the upright center pipe 38. This arrangement allows the water supply pipes 25 to be arranged in the dead space with a high rigidity of the vehicle body. As a result, it is possible to protect the water supply pipes 25, and to enable a compact layout, which secures a large space for occupants.

Moreover, since the shift lever 105 is disposed in a vicinity of the joint point J of the members 36, 37, 38, and 39 constituting the center pipe 35, the shift lever 105 can be provided at a position where the rigidity of the vehicle body is high and where the driver can easily operate the shift lever 105, with no provision of any separate support bracket dedicated to the shift lever 105.

Furthermore, since the side brake lever 106 is disposed on the upper center pipe 36, the side brake lever 106 can also be provided at a position where the driver can easily operate the side brake lever 106, with no provision of any separate support bracket dedicated to the side brake lever 106.

Moreover, the center console cover 28 provided between the driver's seat 9 and the passenger seat 10 houses the center pipe 35, the front propeller shaft 83, the reduction gear 90, the water supply pipes 25, the wire harness 104, the shift lever 105, and the side brake lever 106. Accordingly, the above members can be gathered in the center of the vehicle body, and also covered with the center console cover 28. As a result, the external appearance is improved and also a large space for occupants is secured.

A first embodiment of the present invention provides a frame structure for a vehicle including: a vehicle body frame; a pair of occupant seats being arranged side by side in a vehicle width direction in the vehicle body frame, and constituting a driver's seat and a passenger seat; and a center pipe passing between the driver's seat and the passenger seat and being arranged in a front-rear direction substantially on a center line of a vehicle body in the vehicle body frame.

A second embodiment of the present invention provides the following characteristics in addition to the configuration of the first embodiment. Specifically, the frame structure for a vehicle further includes: a lower frame being disposed to extend in the front-rear direction in both of left and right lower portions of the vehicle body; a pair of left and right side frames extending in the front-rear direction outside the lower frame in the vehicle width direction; and a pair of side pipes each connecting two portions of a corresponding one of the side frames in the front-rear direction. Moreover, in the frame structure for a vehicle, the center pipe is arranged above the lower frame to extend in the front-rear direction substantially on the center line of the vehicle body.

A third embodiment of the present invention provides the following characteristics in addition to the configuration of the first or second embodiment. Specifically, in the frame structure for a vehicle, the center pipe includes: an upper center pipe extending to the front of the vehicle body from a frame constituting, behind the occupant seats, the vehicle body frame; a down center pipe extending upward and frontward from a part, below and between the occupant seats, of a frame constituting the lower frame; an upright center pipe extending rearward and upward from a portion, in front of the occupant seats, of the lower frame; and a front center pipe extending rearward and downward from a frame constituting, in front of the occupant seats, the vehicle body frame. Moreover, the upper center pipe, the down center pipe, the upright center pipe, and the front center pipe are joined together at a joint point in front of the occupant seats.

A fourth embodiment of the present invention provides the following characteristic in addition to the configuration of any one of the first to third embodiments. Specifically, the frame structure for a vehicle further includes a pair of left and right front upper frames extending upward from front ends of the front lower frames, thereafter extending rearward and then being connected to the front upper cross-member, so as to cover a front portion of the vehicle body from above. Moreover, in the frame structure for a vehicle, the front center pipe is formed into the two branches extending frontward respectively to the left and right from the joint point so as to be connected to the front upper cross-member respectively in vicinities of left and right joint portions of the front upper frames to the front upper cross-member.

A fifth embodiment of the present invention provides the following characteristic in addition to the configuration of any one of the first to fourth embodiments. Specifically, a propeller shaft for transmitting a driving force from an internal combustion engine to the front-wheel drive system is disposed along the center pipe.

A sixth embodiment of the present invention provides the following characteristic in addition to the configuration of the fifth embodiment. Specifically, the frame structure for a vehicle further includes: a foot control operable by an occupant's foot; and a reduction gear connected to an intermediate portion of the propeller shaft, and converting a rotational direction of the propeller shaft into a reverse direction. Moreover, in the frame structure for a vehicle, the reduction gear is located in front of the occupant seats, and also behind the foot control, and is disposed between the down center pipe and the upright center pipe.

A seventh embodiment of the present invention provides the following characteristic in addition to the configuration of any one of the first to sixth embodiments. Specifically, in the frame structure for a vehicle, the vehicle body frame includes: a front frame portion supporting the front-wheel drive system; a center frame portion having a space for occupants therein; and a rear frame portion supporting a rear-wheel drive system, and the center pipe is provided in the center frame portion.

According to the first embodiment of the present invention, since the center pipe passes between the driver's seat and the passenger seat and is arranged in the front-rear direction substantially on the center line of the vehicle body in the vehicle body frame, it is possible to improve the rigidity of the vehicle body frame.

According to the second embodiment of the present invention, the frame structure for a vehicle includes the pair of left and right side frames extending in the front-rear direction outside the lower frame in the vehicle width direction. In addition, the front and rear portions of each of the side frames are coupled by the corresponding one of the side pipes, while the center pipe is arranged above the lower frame to extend in the front-rear direction substantially on the center line of the vehicle body. Accordingly, the rigidity of the side portions of the vehicle body frame is secured by the pair of side frames and the pair of side pipes disposed respectively on the upper and lower sides, while the rigidity of the center portion of the vehicle body frame is secured by the center pipe and the lower frames disposed on the upper and lower sides. With this structure, the height of the occupant seats and the floor height can be lowered while the rigidity of the vehicle body frame is sufficiently maintained, so that a low floor and a low center of gravity can be achieved.

According to the third embodiment of the present invention, the center pipe includes the upper center pipe, the down center pipe, the upright center pipe, and the front center pipe, and these pipe members are joined together at the joint point in front of the occupant seats. Accordingly, this center pipe structure makes it possible to improve the rigidity of the vehicle body.

According to the fourth embodiment of the present invention, the frame structure for a vehicle further includes the pair of left and right front upper frames extending from the front ends of the front lower frames in such a manner as to cover a front portion of the vehicle body from above. The front center pipe formed into the left and right branches is connected to the front upper cross-member in the vicinities of the left and right joint portions of the front upper frames to the front upper cross-member. This makes it possible to further improve the rigidity of the vehicle body, and also to reduce a bending force acting on the front upper cross-member.

According to the fifth embodiment of the present invention, the propeller shaft for transmitting the driving force of the internal combustion engine to the front-wheel drive system is disposed along the center pipe. Accordingly, the torsion in the vehicle body is unlikely to act on the propeller shaft. Moreover, the propeller shaft can be disposed by utilizing the dead space below the center pipe, which enables a compact layout, so that a large space for occupants can be secured.

According to the sixth embodiment of the present invention, the reduction gear converting the rotational direction of the propeller shaft into a reverse direction is located in front of the occupant seats, and also behind the foot control, and is disposed between the down center pipe and the upright center pipe. Accordingly the reduction gear can be disposed in the dead space where the rigidity of the vehicle body is high. As a result, it is possible to protect the reduction gear, and to enable a compact layout, which secures a large space for occupants.

According to the seventh embodiment of the present invention, since the center pipe is provided in the center frame portion having the space for occupants therein, the rigidity of the center frame portion can be improved.

It should be noted that the present invention is not limited to the above-described embodiment, and modification, improvement, and the like may be made thereon as appropriate. For example, although the present invention has been described so far as being applied to an MUV (multi utility vehicle), the present invention is not limited to this but may be applied to any type of vehicle having four or more wheels in the same manner.

What is claimed as new and is desired to be secured by Letters Patent of the United States is:

1. A frame structure for a vehicle comprising:
a vehicle body frame having a front-rear direction;
a pair of occupant seats comprising a driver's seat and a passenger seat and arranged side by side in a vehicle width direction substantially orthogonal to the front-rear direction; and
a center pipe extending in the front-rear direction and arranged substantially on a center line of a vehicle body so as to pass through positions between the driver's seat and the passenger seat in the vehicle body frame,
wherein the center pipe comprises:
a joint point located substantially in front of the occupant seats;
an upper center pipe extending frontward to the joint point from a portion of the vehicle body frame located behind the occupant seats; and
a front center pipe extending rearward and downward to the joint point from a portion of the vehicle body frame located in front of the occupant seats.

2. A frame structure for a vehicle comprising:
a vehicle body frame having a front-rear direction;
a pair of occupant seats comprising a driver's seat and a passenger seat and arranged side by side in a vehicle width direction substantially orthogonal to the front-rear direction;
a center pipe extending in the front-rear direction and arranged substantially on a center line of a vehicle body so as to pass through positions between the driver's seat and the passenger seat in the vehicle body frame;
a lower frame above which the center pipe is arranged, the lower frame extending substantially in the front-rear direction and disposed at both of left and right lower portions of the vehicle body;
a pair of left and right side frames extending in the front-rear direction and disposed substantially outside the lower frame in the vehicle width direction; and
a pair of side pipes each coupling two portions of each of the left and right side frames in the front-rear direction.

3. The frame structure for a vehicle according to claim 2, wherein the center pipe comprises,
a joint point located substantially in front of the occupant seats;
an upper center pipe extending frontward to the joint point from a portion of the vehicle body frame located behind the occupant seats;
a down center pipe extending upward and frontward to the joint point from a frame supporting the lower frame so as to pass through positions below and between the occupant seats;
an upright center pipe extending rearward and upward to the joint point from a portion of the lower frame located in front of the occupant seats; and
a front center pipe extending rearward and downward to the joint point from a portion of the vehicle body frame located in front of the occupant seats, and wherein the upper center pipe, the down center pipe, the upright center pipe, and the front center pipe are joined together at the joint point.

4. The frame structure for a vehicle according to claim 3, further comprising:
   a front upper cross-member extending in front of the occupant seats to couple the left and right side frames; and
   a pair of left and right front upper frames extending upward from front ends of the lower frame and then extending rearward to be connected to the front upper cross-member respectively at a first position and a second position thereof, the left and right front upper frames so covering a front portion of the vehicle body,
   wherein the front center pipe comprises two branches extending frontward from the joint point and branched in the vehicle width direction so as to be connected to the front upper cross-member respectively at or in vicinities of the first position and the second position of the front upper cross-member.

5. The frame structure for a vehicle according to claim 1, further comprising:
   a propeller shaft disposed substantially along the center pipe and configured to transmit a driving force from an internal combustion engine to a front-wheel drive system.

6. The frame structure for a vehicle according to claim 3, further comprising:
   a propeller shaft disposed along the center pipe and configured to transmit a driving force from an internal combustion engine to a front-wheel drive system;
   a foot control operable by an occupant's foot; and
   a reduction gear connected to an intermediate portion of the propeller shaft and configured to convert a rotational direction of the propeller shaft into a reverse direction, the reduction gear being located in front of the occupant seats and behind the foot control and being disposed between the down center pipe and the upright center pipe.

7. The frame structure for a vehicle according to claim 1, wherein the vehicle body frame comprises,
   a front frame portion supporting a front-wheel drive system;
   a center frame portion comprising the center pipe and providing a space for the occupant seats; and
   a rear frame portion supporting a rear-wheel drive system.

8. The frame structure for a vehicle according to claim 2, further comprising:
   a propeller shaft disposed substantially along the center pipe and configured to transmit a driving force from an internal combustion engine to a front-wheel drive system.

9. The frame structure for a vehicle according to claim 3, further comprising:
   a propeller shaft disposed substantially along the upper center pipe, the down center pipe, and the upright center pipe, and configured to transmit a driving force from an internal combustion engine to a front-wheel drive system.

10. The frame structure for a vehicle according to claim 4, further comprising:
    a propeller shaft disposed substantially along the upper center pipe, the down center pipe, and the upright center pipe, and configured to transmit a driving force from an internal combustion engine to a front-wheel drive system.

11. The frame structure for a vehicle according to claim 4, further comprising:
    a propeller shaft disposed along the center pipe and configured to transmit a driving force from an internal combustion engine to a front-wheel drive system;
    a foot control operable by an occupant's foot; and
    a reduction gear connected to an intermediate portion of the propeller shaft and configured to convert a rotational direction of the propeller shaft into a reverse direction, the reduction gear being located in front of the occupant seats and behind the foot control and being disposed between the down center pipe and the upright center pipe.

12. A frame structure for a vehicle comprising:
    a vehicle body frame having a front-rear direction;
    a pair of occupant seats comprising a driver's seat and a passenger seat and arranged side by side in a vehicle width direction substantially orthogonal to the front-rear direction;
    a center pipe extending in the front-rear direction and arranged substantially on a center line of a vehicle body so as to pass through positions between the driver's seat and the passenger seat in the vehicle body frame;
    a propeller shaft disposed substantially along the center pipe and configured to transmit a driving force from an internal combustion engine to a front-wheel drive system;
    a foot control operable by an occupant's foot; and
    a reduction gear connected to an intermediate portion of the propeller shaft and configured to convert a rotational direction of the propeller shaft into a reverse direction, the reduction gear being located in front of the occupant seats and behind the foot control and being disposed between the down center pipe and the upright center pipe.

13. The frame structure for a vehicle according to claim 2, wherein the vehicle body frame comprises,
    a front frame portion supporting a front-wheel drive system;
    a center frame portion comprising the center pipe, the left and right side frames, and the side pipes, and providing a space for the occupant seats; and
    a rear frame portion supporting a rear-wheel drive system, and
    wherein the lower frame supports the front frame portion, the center frame portion, and the rear frame portion.

14. The frame structure for a vehicle according to claim 3, wherein the vehicle body frame comprises,
    a front frame portion supporting a front-wheel drive system;
    a center frame portion comprising the joint point, the upper center pipe, the down center pipe, the upright center pipe, and the front center pipe, and providing a space for the occupant seats; and
    a rear frame portion supporting a rear-wheel drive system, and
    wherein the lower frame supports the front frame portion, the center frame portion, and the rear frame portion.

15. The frame structure for a vehicle according to claim 4, wherein the vehicle body frame comprises,
    a front frame portion comprising the left and right front upper frames and supporting a front-wheel drive system;
    a center frame portion comprising the joint point, the upper center pipe, the down center pipe, the upright center pipe, the front center pipe, and the front upper cross-member, and providing a space for the occupant seats; and a rear frame portion supporting a rear-wheel drive system, and wherein the lower frame supports the front frame portion, the center frame portion, and the rear frame portion.

16. The frame structure for a vehicle according to claim 5, wherein the vehicle body frame comprises,
- a front frame portion supporting the front-wheel drive system;
- a center frame portion comprising the center pipe and providing a space for the occupant seats; and
- a rear frame portion supporting the rear-wheel drive system, and wherein the lower frame supports the front frame portion, the center frame portion, and the rear frame portion.

17. The frame structure for a vehicle according to claim 6, wherein the vehicle body frame comprises,
- a front frame portion supporting the front-wheel drive system;
- a center frame portion comprising the center pipe, the foot control, and the reduction gear, and providing a space for the occupant seats; and
- a rear frame portion supporting the rear-wheel drive system, and wherein the lower frame supports the front frame portion, the center frame portion, and the rear frame portion.

18. A vehicle comprising:
an internal combustion engine;
a vehicle body frame having a front-rear direction and supporting the internal combustion engine;
a pair of occupant seats comprising a driver's seat and a passenger seat and arranged side by side in a vehicle width direction substantially orthogonal to the front-rear direction; and
a center pipe extending in the front-rear direction and arranged substantially on a center line of a vehicle body so as to pass through positions between the driver's seat and the passenger seat in the vehicle body frame, wherein the center pipe comprises:
- a joint point located substantially in front of the occupant seats;
- an upper center pipe extending frontward to the joint point from a portion of the vehicle body frame located behind the occupant seats; and
- a front center pipe extending rearward and downward to the joint point from a portion of the vehicle body frame located in front of the occupant seats.

19. The vehicle according to claim 18, further comprising:
- a lower frame above which the center pipe is arranged, the lower frame extending substantially in the front-rear direction and disposed at both of left and right lower portions of the vehicle body;
- a pair of left and right side frames extending in the front-rear direction and disposed substantially outside the lower frame in the vehicle width direction; and
- a pair of side pipes each coupling two portions of each of the left and right side frames in the front-rear direction.

20. The frame structure for a vehicle according to claim 1, further comprising:
a lower frame above which the center pipe is arranged, the lower frame extending substantially in the front-rear direction and disposed at both of left and right lower portions of the vehicle body, wherein the center pipe further comprises,
- a down center pipe extending upward and frontward to the joint point from a frame supporting the lower frame so as to pass through positions below and between the occupant seats; and
- an upright center pipe extending rearward and upward to the joint point from a portion of the lower frame located in front of the occupant seats, and wherein the upper center pipe, the down center pipe, the upright center pipe, and the front center pipe are joined together at the joint point.

* * * * *